United States Patent
Bikumandla

(10) Patent No.: US 9,671,495 B2
(45) Date of Patent: Jun. 6, 2017

(54) SYSTEMS AND METHODS FOR OPTICAL PROXIMITY DETECTION WITH MULTIPLE FIELD OF VIEWS

(71) Applicant: Intersil Americas LLC, Milpitas, CA (US)

(72) Inventor: Manoj Bikumandla, San Jose, CA (US)

(73) Assignee: INTERSIL AMERICAS LLC, Milpitas, CA (US)

(*) Notice: Subject to any disclaimer, the term of this patent is extended or adjusted under 35 U.S.C. 154(b) by 421 days.

(21) Appl. No.: 14/521,308

(22) Filed: Oct. 22, 2014

(65) Prior Publication Data

US 2015/0362594 A1 Dec. 17, 2015

Related U.S. Application Data

(60) Provisional application No. 62/010,947, filed on Jun. 11, 2014.

(51) Int. Cl.
| | |
|---|---|
| *G01S 17/02* | (2006.01) |
| *G01S 17/46* | (2006.01) |
| *G01S 7/486* | (2006.01) |

(52) U.S. Cl.
CPC ......... *G01S 17/026* (2013.01); *G01S 7/4863* (2013.01); *G01S 17/46* (2013.01)

(58) Field of Classification Search
CPC .... G01S 17/026; G01S 15/8993; G01S 17/89; G01J 3/2823; G06T 7/20; G06T 11/003

USPC ............................................. 250/214 R, 221
See application file for complete search history.

(56) References Cited

U.S. PATENT DOCUMENTS

| | | | |
|---|---|---|---|
| 4,725,891 A * | 2/1988 | Manian | H04N 1/06 358/406 |
| 7,248,344 B2 | 7/2007 | Morcom | |
| 8,422,729 B2 | 4/2013 | Silver et al. | |
| 2007/0228262 A1 | 10/2007 | Cantin et al. | |

* cited by examiner

*Primary Examiner* — Que T Le
(74) *Attorney, Agent, or Firm* — Foley & Lardner LLP; Mark J. Danielson

(57) ABSTRACT

An optical proximity detector includes a plurality photodetectors (PDs) and a winner-take-all (WTA) circuit. Each of the PDs has a respective field of view (FOV) and produces a respective analog current detection signal indicative of light incident on and detected by the PD. In an embodiment, the WTA circuit includes a comparator and a multiplexor (MUX). The comparator compares the analog current detection signals produced by the PDs and produces a selection signal in dependence thereon. The MUX receives the analog current detection signals produced by the PDs and outputs one of the analog current detection signals in dependence on the selection signal produced by the comparator. Circuitry, which is shared by the PDs, produces a digital detection signal corresponding to the one of the analog current detection signals output by the MUX. Such design can be used to reduce power consumption, size and cost of an optical proximity detector.

20 Claims, 7 Drawing Sheets

SYSTEMS AND METHODS FOR OPTICAL PROXIMITY DETECTION WITH MULTIPLE FIELD OF VIEWS

PRIORITY CLAIM

This application claims priority to U.S. Provisional Patent Application No. 62/010,947, filed Jun. 11, 2014, which is incorporated herein by reference.

BACKGROUND

Optical proximity detectors are often included in systems, such as consumer products and/or other types of products, to detect the presence of obstacles or other objects within one or more field-of-views (FOVs), so that the systems can respond to such detections. For example, an autonomous robot may use an optical proximity detector to detect when an obstacle is in its way, so that they robot may move around the obstacle. For another example, a vehicle may include an optical proximity detector to notify a driver when the driver is driving to close to another vehicle, or when an object is behind the vehicle when the vehicle is backing up. For still another example, an optical proximity detector can be used to help control a driverless vehicle. These are just a few examples, which are not meant to be all encompassing.

It is desirable to reduce the power consumed by optical proximity detectors and to reduce the size and cost of optical proximity detectors, especially when optical proximity detectors are used in mobile devices that are battery powered and/or relatively small in size.

DETAILED DESCRIPTION

Figure 1:
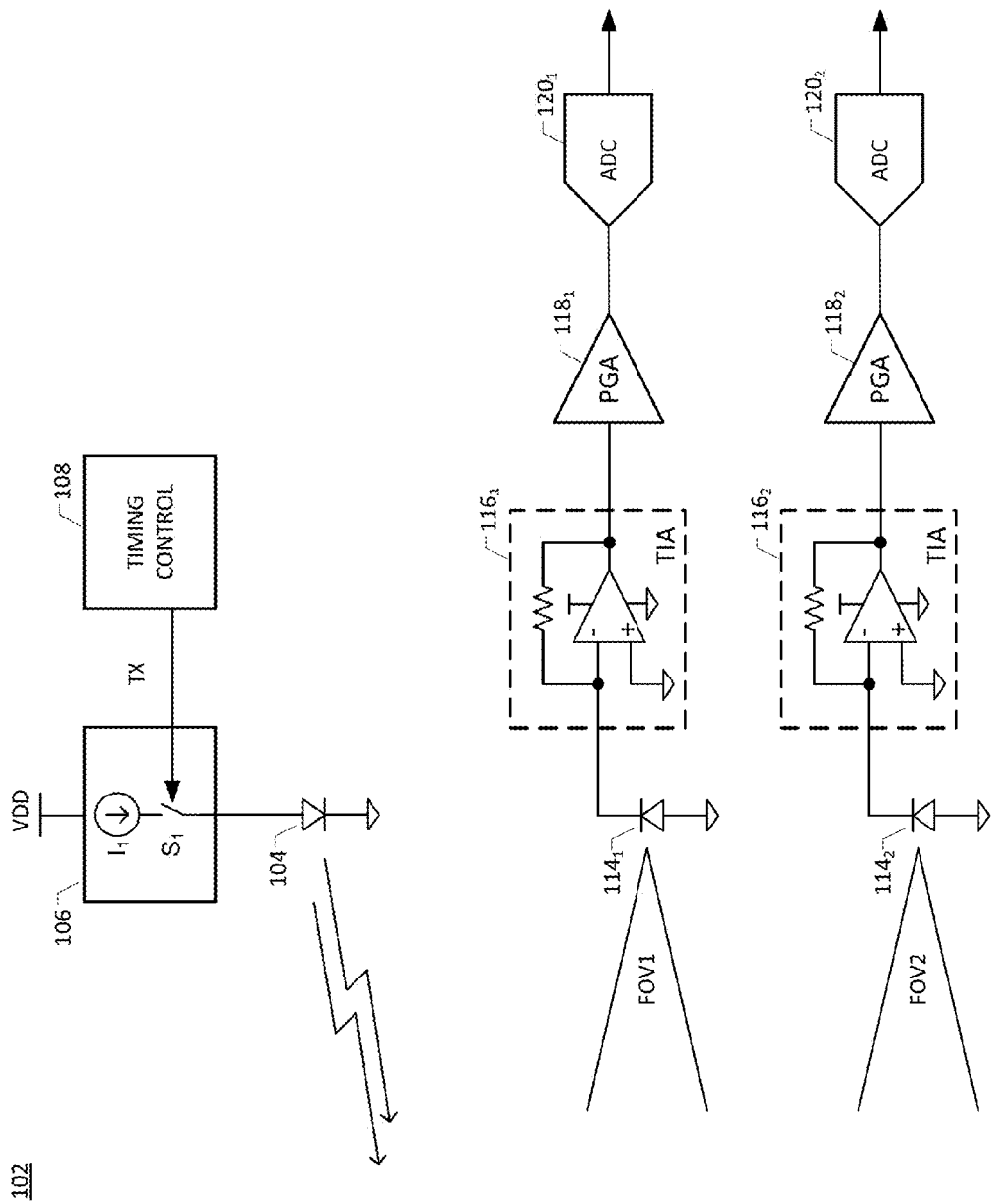
FIG. 1 is a high level block diagram of an exemplary optical proximity detector.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout. In addition, the first digit of a reference number identifies the drawing in which the reference number first appears.

FIG. 1 shows an exemplary optical proximity detector 102, which can be used to detect the presence of an object, estimate proximity of an object and/or detect motion of an object. The optical proximity detector 102 includes an emitter portion including a light source 104, a driver 106 and a timing controller 108. Additionally, the optical proximity detector 102 includes a detector portion that is shown as including two optical detection channels. A first optical detection channel includes a photodetector (PD) $114_1$, and a second optical detection channel includes a PD $114_2$. In this embodiment, the first optical detection channel also include a transimpedance amplifier (TIA) $116_1$, a programmable gain amplifier (PGA) $118_1$ and an analog-to-digital converter (ADC) $120_1$. Similarly, the second optical detection channel also includes a TIA $116_2$, a PGA $118_2$ and an ADC $120_2$. While only two optical detection channels are shown in FIG. 1, more than two optical detection channels are also possible. In other words, there can be n separate optical detection channels, where n≥2. Each PD $114_1$, $114_2$ has its own field of view (FOV), which may or may not overlap with the FOV of another PD. More generally, where there are n separate PDs, there are n separate FOVs, each of which may or may not overlap one or more other FOVs, depending upon implementation (e.g., depending upon relative locations and distances between PDs, the the FOV of each PD).

The PDs $114_1$, $114_2$ can be individually referred to as a PD 114, and can collectively be referred to as the PDs 114. The TIAs $116_1$, $116_2$ can be individually referred to as a TIA 116, and can collectively be referred to as the TIAs 116. The PGAs $118_1$, $118_2$ can be individually referred to as a PGA 118, and can collectively be referred to as the PGAs 118. Similarly, the ADCs $120_1$, $120_2$ can be individually referred to as an ADC 120, and can collectively be referred to as the ADCs 116.

The driver 106 is controlled by a transmit (TX) signal output by the timing controller 108 or some other controller to selectively drive a light source 104. The driver 106 is generally shown as including a current source $I_1$ and a switch $S_1$ that is selectively closed based on the transmit (TX) signal output by the timing controller 108. When the switch $S_1$ is closed, the current produced by the current source $I_1$ is provided to the anode of the light source 104, to thereby selectively cause light to be emitted. Alternatively, the TX signal can selectively cause a current to be pulled through the light source 104, e.g., by coupling the switch $S_1$ and the current source $I_1$ between the cathode of the light source 104 and a low voltage rail (e.g., ground), to thereby cause light to be emitted. In such an alternative configuration, the current source may be referred to as a current sink.

The light source 104 can be, e.g., one or more light emitting diode (LED) or laser diode, but is not limited thereto. Depending upon implementation and application, the different light detection channels can have their own light source 104, or they may share the same light source 104. While infrared (IR) light sources are often employed in optical proximity detectors, because the human eye cannot detect IR light, the light source 104 can alternatively produce light of other wavelengths. Each PD 114 can be, e.g., one or more photodiode, but is not limited thereto. In embodiments including multiple light sources 104 (e.g., one for each light detection channel), each light source can include its own driver 106 that is controlled by the transmit (TX) signal output by the timing controller 108.

Each PD 114 generates a current detection signal that is indicative of the intensity and phase of the light incident on and detected by the PD 114. Each TIA 116 converts the current detection signal produce by the PD 114, to which the TIA is connected, to a voltage detection signal. Each PGA 118, or more generally amplifier, amplifies the voltage detection signal output by the TIA 116 before it is provided to the ADC 120. The ADC 120 digitizes the voltage detection signal, and more generally, produces a digital output signal (e.g., an N-bit signal) that can be used to detect the presence, proximity and/or motion of an object within the FOV of the PD 114.

Optical proximity detectors, such as the one shown in FIG. 1, are often included in systems, such as consumer products and/or other types of products, to detect the presence of obstacles or other objects within one or more FOVs, so that the systems can response to such detections. For example, an autonomous robot may use an optical proximity detector to detect when an obstacle is in its way, so that they robot may move around the obstacle. For another example, a vehicle may include an optical proximity detector to notify a driver when the driver is driving too close to another vehicle, or when an object is behind the vehicle when the vehicle is backing up. For still another example, an optical proximity detector can be used to help control a driverless vehicle. These are just a few examples, which are not meant to be all encompassing.

It is desirable to reduce the power consumed by optical proximity detectors and to reduce the size and cost of optical proximity detectors, especially when optical proximity detectors are used in mobile devices that are battery powered and/or relatively small in size. Embodiments of the present invention, which are described herein, can be used to achieve one or more of the aforementioned desirable features of optical proximity detectors.

Figure 2:
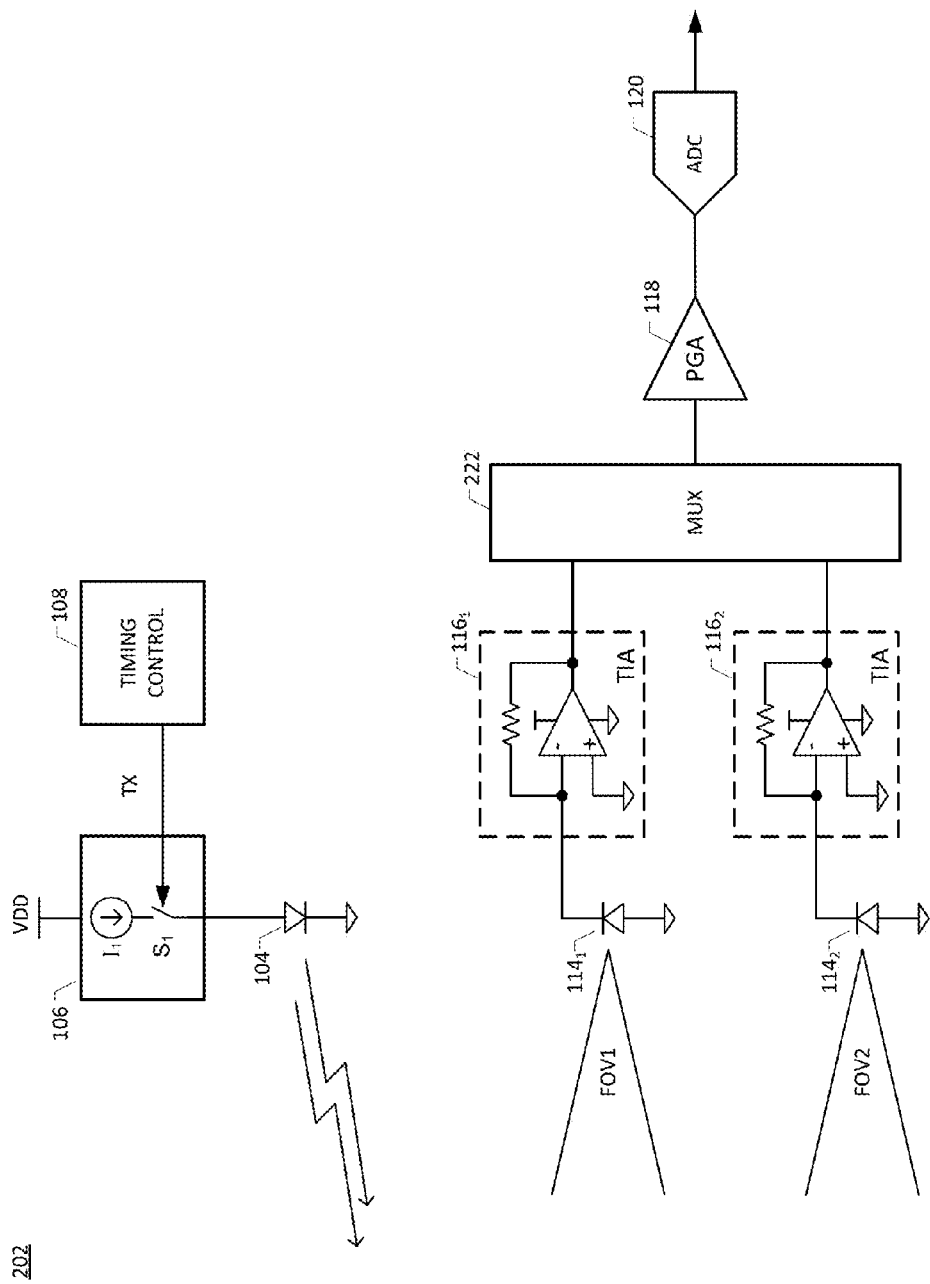
FIG. 2 is a high level block diagram of an exemplary optical proximity detector which includes a multiplexer that enables a single amplifier and analog-to-digital converter (ADC) to be shared by multiple photodetectors (PDs).

FIG. 2 illustrates an exemplary optical proximity detector 202 which includes a multiplexer 222 that enables a single PGA 118 and a single ADC 120 to be shared by multiple PDs 114. However, if there is a desire to compare the intensity and/or phase of the light incident on the PD $114_1$ to the intensity and/or phase of the light incident on the PD $114_2$, the optical proximity detector 202 has a few disadvantages. For example, a first digital output of the ADC 120 (producing during a first period of time during which the MUX 222 outputs the signal it receives from the TIA $116_1$) needs to be saved in order for it to be compared to a second digital output of the ADC 120 (produced during a second period of time during which the MUX 222 outputs the signal it receives from the TIA $116_2$). In other words, analog-to-digital conversions need to be performed sequentially, which slows down performance, and necessitates that one or more outputs of the ADC 120 be stored to allow for comparisons of different outputs of the ADC 120. Additionally, the position(s) of object(s) within the FOVs of the multiple PDs 114 may change from the first period of time to the second period of time, potentially reducing the accuracy and usefulness of results of the aforementioned comparisons.

Figure 3:
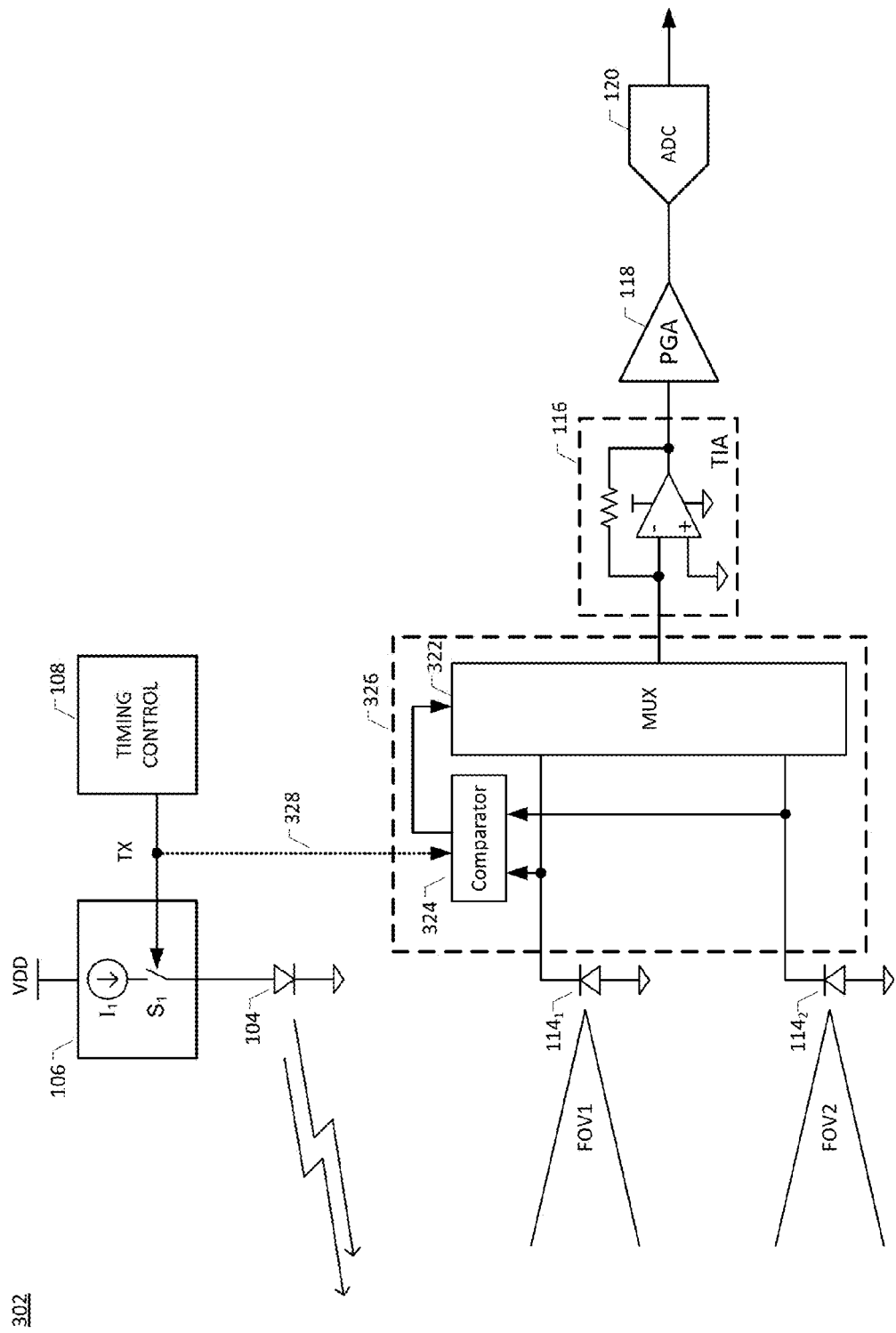
FIG. 3 is a high level block diagram of an optical proximity detector according to an embodiment of the present invention.

FIG. 3 illustrates an optical proximity detector 302, which can also be referred to as an optical proximity sensor 302, according to an embodiment of the present invention. The light source 104, driver 106 and timing controller 108 operate in the same manner as discussed above with reference to FIG. 1, and thus need not be described again. As mentioned above, each of the different light detection channels can have their own light source 104, or they may share the same light source 104. The PD $114_1$ generates a first current detection signal that is indicative of the intensity and phase of light emitted by the light source 104 that reflect off an object (within the FOV1) and is incident on and detected by the PD $114_1$. At the same time, the PD $114_2$ generates a second current detection signal that is indicative of the intensity and phase of light that reflect off an object (within the FOV2) and is incident on and detected by the PD $114_2$. Where the light source 104 emits IR light, it is preferably that each of the optical detection channels is primarily responsive to detected IR light, and more generally, that ambient light is rejected. To reject ambient light, an optical IR rejection filter can be placed over each PD 114. Other known as well as future developed techniques for rejecting ambient light can alternatively or additionally be used. Regardless of what ambient light rejection technique is used, where the light source 104 emits IR light the first current detection signal produced by the PD $114_1$ is preferably primarily indicative of the intensity and phase of IR light emitted by the light source 104 that reflect off an object (within the FOV1) and is incident on and detected by the PD $114_1$. Similarly, the second current detection signal produced by the PD $114_2$ is preferably primarily indicative of the intensity and phase of IR light emitted by the light source 104 (or another light source) that reflect off an object (within the FOV2) and is incident on and detected by the PD $114_2$.

A comparator 324 compares the first and second current signals, and based on the comparison, selects which one of the first and second current signals is output by a multiplexer (MUX) 322. In other words, the comparator 324 produces a selection signal that is used to control the MUX 322. The output of the MUX 322 is provide to a TIA 116, which converts the current signal (output by the MUX 322) to a voltage signal. The PGA 118 amplifies the voltage signal output by the TIA 116, and the ADC 120 converts the amplified voltage signal (output by the PGA 118) to a digital signal. In this embodiment, a single TIA 116, a single PGA 118 and a single ADC 120 are shared by multiple PDs 114, without the disadvantages discussed above with reference to FIG. 2. For example, analog-to-digital conversions need not be performed sequentially. Further, there is no need to store one or more outputs of the ADC 120 to allow for comparisons of different outputs of the ADC 120. The TIA 116, PGA 118 and ADC 120 are an example of circuitry that produces a digital detection signal corresponding to the one of the analog current detection signals output by the MUX. Such circuitry is advantageously shared by multiple optical channels. The use of alternative circuitry that is shared by multiple channels is also possible and within the scope of an embodiment.

In accordance with an embodiment, the comparator 324 compares the amplitude of the first current signal (produced by the PD $114_1$) to the amplitude of the second current signal (produced by the PD $114_2$) to identify which amplitude is greater, and controls the MUX 322 to cause the current signal having the greatest amplitude to be output by the MUX 322. Accordingly, the comparator 324 and the MUX 322 can be collectively referred to as a current amplitude winner-take-all (WTA) circuit 326. An exemplary implementation of the comparator 324, which compares the amplitude of the first current signal (produced by the PD $114_1$) to the amplitude of the second current signal (produced by the PD $114_2$) to identify which amplitude is greater, is shown in and described below with reference to FIG. 4. In this embodiment, if there is an object within only one of the FOVs, then the current signal having the greatest amplitude corresponds to the PD having the object within its FOV. If there is an object within more than one of the FOVs, then the current signal having the greatest amplitude corresponds to the PD having the closest object within its FOV.

In accordance with another embodiment, the comparator 324 compares a phase associated with the first current signal (produced by the PD $114_1$) to a phase associated with the second current signal (produced by the PD $114_2$). For example, the phase associated with the first current signal (produced by the PD $114_1$) can be the phase difference between the first current signal and the TX signal (which can be provided to the comparator, as indicated by the dashed line 328) or some other reference signal. Similarly, the phase associated with the second current signal (produced by the PD $114_2$) can be the phase difference between the second current signal and the TX signal or the other reference signal. In this embodiment, the comparator 324 compares the phase difference associated with the first current signal (produced by the PD $114_1$) to the phase difference associated with the second current signal (produced by the PD $114_2$) to identify the smallest phase difference relative to the TX signal or some other reference signal. In this embodiment, if there is an object within only one of the FOVs, then the current signal having the smallest phase difference corresponds to the PD having the object within its FOV. If there is an object within more than one of the FOVs, then the current signal having the smallest phase difference corresponds to the PD having the closest object within its FOV. Accordingly, in this embodiment the comparator 324 and the MUX 322 can be collectively referred to as a phase difference winner-take-all (WTA) circuit 326.

Figure 4:
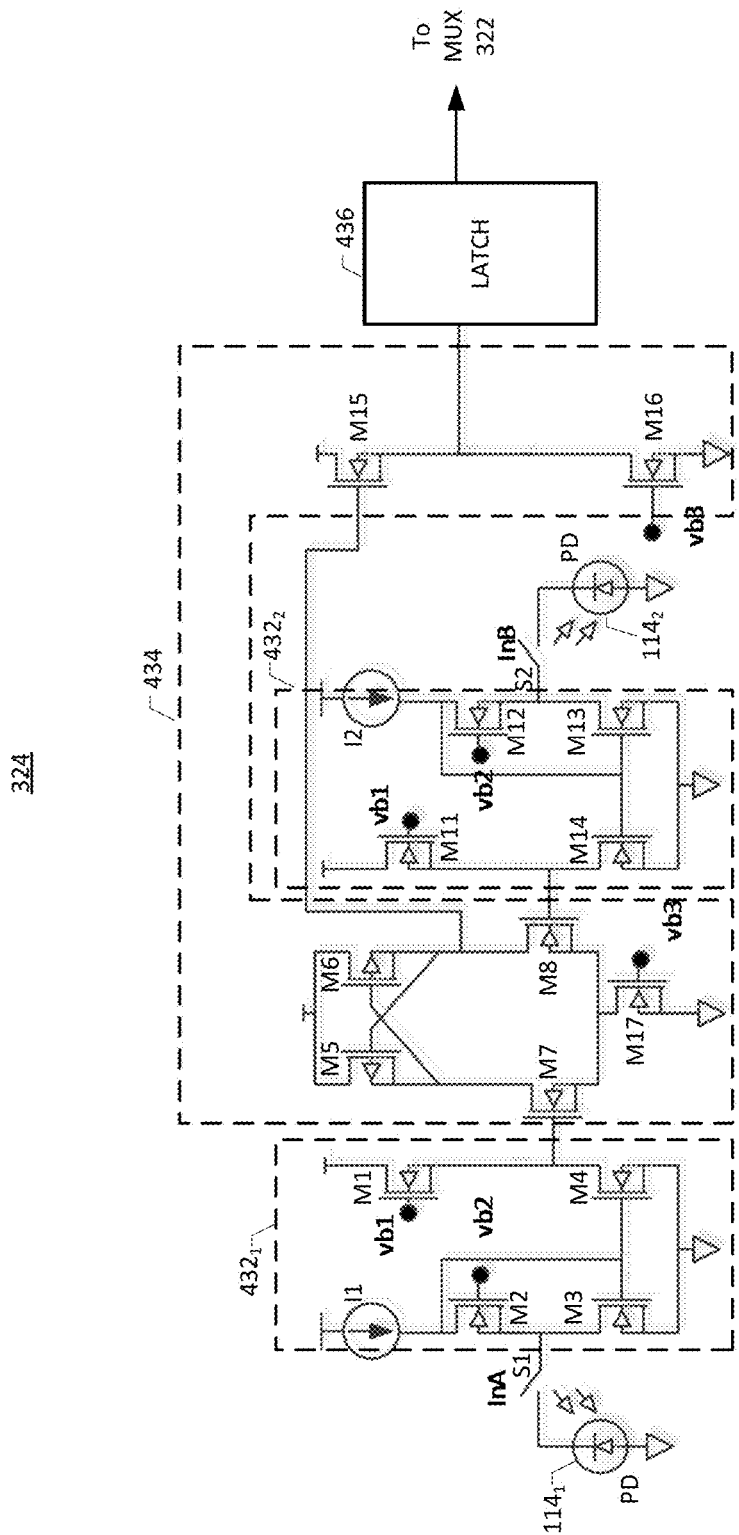
FIG. 4 illustrates an implementation of the comparator, introduced in FIG. 3, according to an embodiment of the present invention.

An exemplary implementation of the comparator 324, which compares the amplitude of the first current signal (produced by the PD $114_1$) to the amplitude of the second current signal (produced by the PD $114_2$) to identify which amplitude is greater, will now be described with reference to FIG. 4. Referring to FIG. 4, transistors M1-M4 and a current source I1 are configured as a first low impedance input circuit $432_1$. Transistors M11-M14 and a current source I2 are configured as a second low impedance input circuit $432_1$. Transistors M5-M8 and M15-M17 are configured as a current amplitude comparator 434, with the inputs of the current amplitude comparator 434 being the gates of the transistors M7 and M8. The current sources I1 and I2 are matched and are used to bias (and more specifically increase) the currents provided to inputs of the current amplitude comparator 434. Bias voltages vb1, vb2, vb3 and vb4 are used to bias various transistors. The switches S1 and S2, which are opened and closed at the same time, are used to selectively provide the first and second current signals, produce respectively by the PD $114_1$ and the PD $114_2$, to the comparator 324 (and more specifically, to the low impedance input circuits 432). The transistor M15 is turned on and off in dependence which one of the first and second current signals is the greater. When the first current signal (produced by the PD $114_1$) is greater than the second current signal (produced by the PD $114_2$), then the transistor M15 is turned on, and the input to a latch 436 is high. When the second current signal (produced by the PD $114_2$) is greater than the first current signal (produced by the PD $114_1$), then the transistor M15 is turned off, and the input to the latch 436 is low. The latch 436 latches either a low or high logic state, which is used to control the MUX 322. In other words, the latch stores the select signal. When the first current signal (produced by the PD $114_1$) is greater than the second current signal (produced by the PD $114_2$), a high logic state is latched by the latch 436, which causes the MUX 322 to output the first current signal (produced by the PD $114_1$). When the second current signal (produced by the PD $114_2$) is greater than the first current signal (produced by the PD $114_1$), a low logic state is latched by the latch 436, which causes the MUX 322 to output the second current signal (produced by the PD $114_2$).

Advantages of the embodiments described with reference to FIG. 3 and FIG. 4 is that they require less analog circuitry than the embodiments shown in FIGS. 1 and 2. Additionally, embodiments described with reference to FIG. 3 and FIG. 4 consume less power than embodiments shown in FIGS. 1 and 2. Further, embodiments described with reference to FIG. 3 and FIG. 4 are faster than the embodiment shown in FIG. 2.

While only two optical detection channels are shown in FIG. 3, more than two optical detection channels are also possible. In other words, there can be n separate optical detection channels, where n≥2, with each channel including its own PD 114. Each PD 114 has its own field of view (FOV), which may or may not overlap with the FOV of another PD. Where there are more than two PDs, and thus more the two FOVs, the comparator 324 is configured to compare more than two signals to one another, and the MUX 322 has more than two inputs.

The current amplitude comparator 434 in FIG. 4 is an example of a comparator that compares amplitudes of a plurality of analog current detection signals to one another and produces the selection signal in dependence on which one of the analog current detection signal has a greatest amplitude. As explained above, in an alternative embodiment, the comparator can be a phase comparator that produces the selection signal in dependence on which one of the two or more analog current detection signals has a lowest phase difference relative to a transmit signal or some other reference signal.

Referring to FIGS. 3 and 4, in accordance with an embodiment the latch 436 of the comparator 324 can be implemented, e.g., using a set-reset (SR) flip-flop, or a D flip-flop, but is not limited thereto. If the latch 426 is implemented using an SR flip-flop, the SR flip-flop can be reset using the transmit (TX) signal, and can be set using a delayed version of the TX signal so that it is set at a predetermined time interval after the TX signal causes the light source 104 to emit a pulse or burst of light. This can be achieved, e.g., by providing the TX signal to a reset (R) input of the SR flip-flop and by using a delay circuit to provide a delayed version of the TX signal to a set (S) input of the SR flip-flop. In accordance with an embodiment, at a predetermine time interval after the SR flip-flop is set, the ADC 120 can be triggered to perform a conversion. This can be achieved, e.g., by using a further delay circuit to provide a further delayed version of the TX signal to a conversion triggering input of the ADC 120. Instead of using the aforementioned delay circuits to produce the set and reset signals, a controller (e.g., 108 in FIG. 3 or 608 in FIG. 6 discussed below) can generate the set and reset signals and provide them directly to the latch 436. More generally, a controller (e.g., 108 or 608) can generate the timing signals used to control the comparator 324 and the ADC 120. FIG. 7 illustrates an exemplary timing diagram for exemplary signals that can be used to control the light source 104, the comparator 324 and the ADC 120.

Embodiments of the present invention are also directed to methods described below with reference to FIG. 5, wherein such methods can, e.g., be performed using the embodiments described above with reference to FIG. 3, and potentially also using the embodiment described with reference to FIG. 4 and FIG. 6. More specifically, certain embodiments relate to methods for producing a digital output indicative of which PD, of a plurality of PDs, has a closest object to the PD within the FOV of the PD. Details of such a method will now be described with reference to the high level flow diagram of FIG. 5

Figure 5:
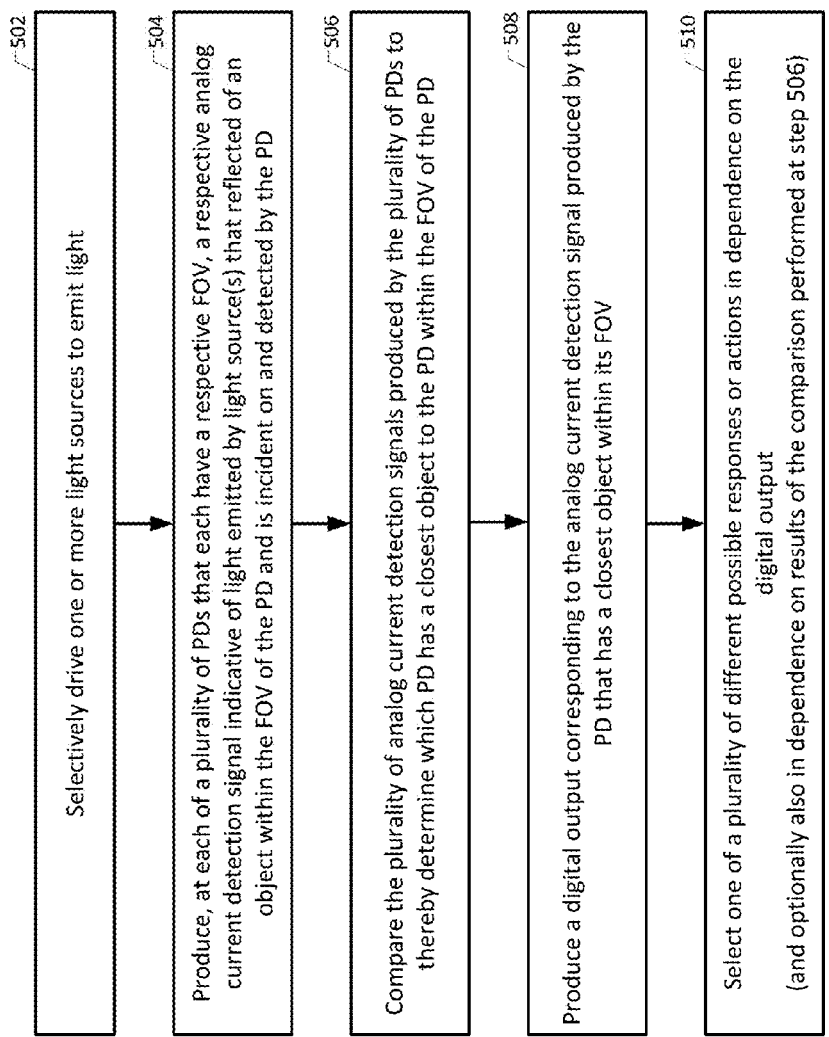
FIG. 5 is a high level flow diagram that is used to describe methods according to various embodiments of the present invention.

Referring to FIG. 5, step 502 involves selectively driving one or more light sources to emit light. Step 504 involves producing, at each of a plurality of photodetectors (PDs) that each have a respective field of view (FOV), a respective analog current detection signal indicative of light emitted by one more light sources that reflected of an object within the FOV of the PD and is incident on and detected by the PD. Step 506 involves comparing the plurality of analog current detection signals produced by the plurality of PDs to thereby determine which PD has a closest object to the PD within the FOV of the PD. In accordance with certain embodiments, step 506 is performed by comparing amplitudes of the analog current detection signals produced by the plurality of PDs to determine which analog current detection signal has a greatest amplitude. Alternatively, step 506 can be performed by determining which one of the analog current detection signals has a lowest phase difference relative to a transmit signal that is used to selectively drive the light source(s) at step 502, or relative to some other reference signal. Additional details of such methods can be appreciated from the above descriptions of FIGS. 1-4.

Still referring to FIG. 5, step 508 involves producing a digital output corresponding to the analog current detection signal produced by the PD that has a closest object within its FOV. If only one of the PDs have an object within its FOV, then the digital output produced at step 508 will be indicate which PD has the object within its FOV. If more than one of the PDs has an object within its FOV, then the digital output produced at step 508 will indicate which of the PDs (that has an object within its FOV) has the closest object to the PD. Still referring to FIG. 5, step 510 involves selecting one of a plurality of different possible responses or actions in dependence on the digital output produced at 508. The selecting one of a plurality of different possible responses or actions at step 510 can also be in dependence on the results of the comparing at step 506, so that the selecting of a response or action is also based on which FOV included an object or closet object. Additionally, or alternatively, step 510 can involve selectively enabling or disabling a subsystem in dependence on the digital output produced at step 508. The selectively enabling or disabling a subsystem at step 510 can also be in dependence on the results of the comparing at step 506, so that the selectively enabling or disabling is also based on which FOV included an object or closet object.

For an example, the above described method can be used by a controller of an autonomous robot to detect when an object is in the path of the robot, so that the robot can be controlled to move around the object, which in this example can also be referred to as an obstacle. The robot may have two or more PDs that are spaced about a perimeter of the robot, with each of the PDs having its own field of view (FOV). The PDs can be used, in combination with one or more light sources, to determine when an object is within one of the FOVs. Or, if more than one of the PDs has an object within its FOV, then the method can be used to determine which of the PDs (that has an object within its FOV) has the closest object to the PD. Such information can be used to assist in controlling the robot to navigate around object(s) without colliding with the object(s). For a more specific example, while a robot is traveling in a particular direction, the method can be used to determine that there is an object within the path that the robot is traveling, but that there is no object to the left of the robot, which would enable the robot to be controlled to turn left to avoid colliding with the object that was in its path. For another example, the above method can be used by a system or device that includes keys or buttons, each of which has its own PD, to determine which key or button is being selected by a user, and an appropriate response can be activated based on which key or button is determined to have been selected. These are just a few examples, which are not intended to be all encompassing.

Figure 6:
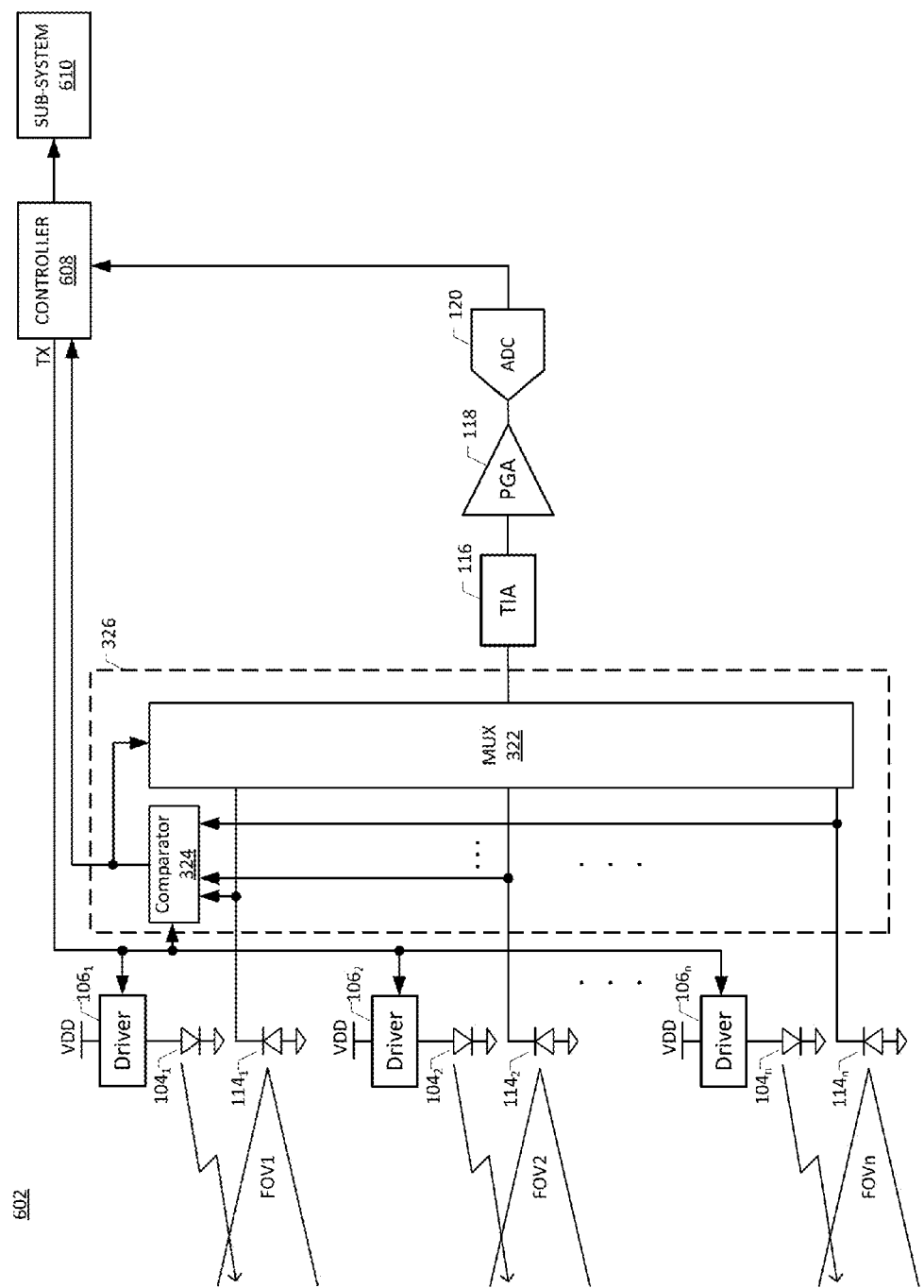
FIG. 6 illustrates an exemplary system accordance to an embodiment of the present invention.
Figure 7:
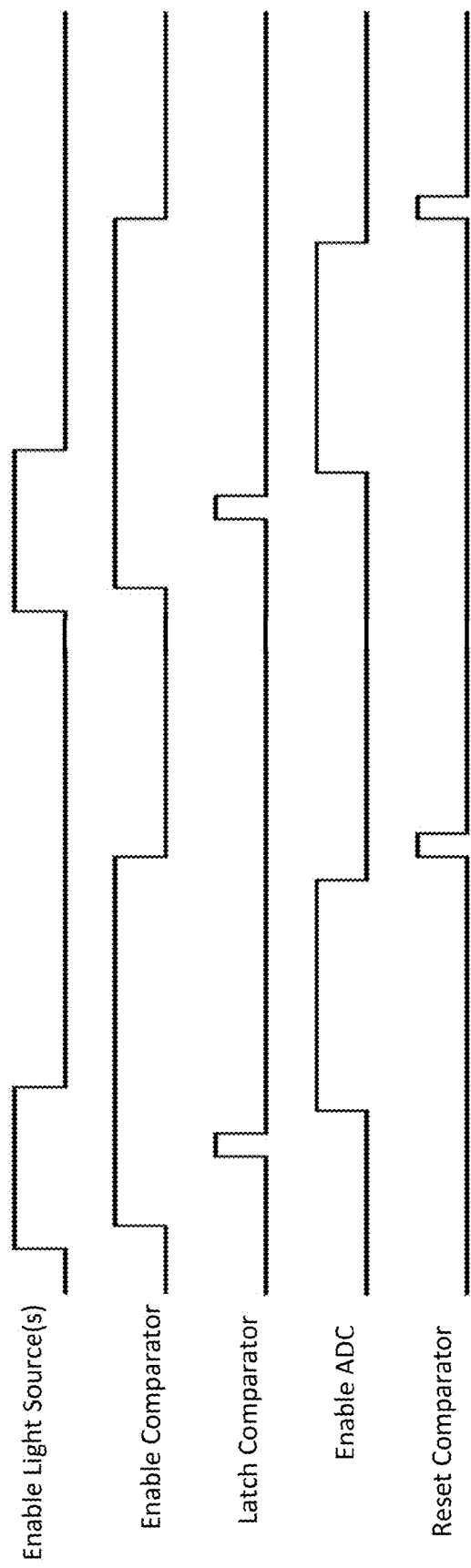
FIG. 7 illustrates an exemplary timing diagram for exemplary signals that can be used to control the light source(s), the comparator and the ADC of an optical proximity sensor in accordance with an embodiment.

FIG. 6 illustrates an exemplary system 602 according to an embodiment of the present invention. The system 602 is shown as including a plurality of light sources $104_1$, $104_2$ ... $104_n$, but can alternatively include a single light source 104. The system 602 is also shown as including a plurality of drivers $106_1$, $106_2$ ... $106_n$, but can alternatively include a single driver 106. The system is also shown as including a plurality photodetectors (PDs) $114_1$, $114_2$ ... $114_n$, each having a respective field of view (FOV) and each producing a respective analog current detection signal indicative of light incident on and detected by the PD 114. The plurality of PDs 104 can be as few as two PDs. A winner-take-all (WTA) circuit 326 receives the plurality of analog current detection signals produced by the plurality of PDs 114 and outputs the one of the analog current detection signals that corresponds to the PD having a closest object within its FOV. This means that if there is an object within only one of the FOVs, then the analog current detection signal output by the WTA circuit 326 corresponds to the only PD having the object within its FOV; and if there is an object within more than one of the FOVs, then the analog current detection signal output by the WTA circuit 326 corresponds to the PD having the closest object within its FOV. One object can be within more than one FOV and/or different objects can be within different FOVs.

Still referring to FIG. 6, the system 602 is also shown as including a transimpedance amplifier (TIA) 116 that converts the one of the analog current detection signals, output by the WTA circuit 326, to an analog voltage detection signal. An amplifier 118, which in this example is a programmable gain amplifier (PGA), amplifies the analog voltage detection signal to produce an amplified analog voltage detection signal. An analog-to-digital converter (ADC) 120 converts the amplified analog voltage detection signal to a digital detection signal. The digital detection signal is provided to a controller 608. The controller is also shown as receiving the selection signal produced by the comparator 324, or more generally, by the WTA circuit 326. As explained above, the selection signal indicates which PD 114 has the closest object within its FOV.

In the embodiment shown in FIG. 6, the WTA circuit 326 includes a comparator 324 that compares the plurality of analog current detection signals produced by the plurality of PDs 104 and produces a selection signal in dependence thereon. The WTA circuit 326 also includes a multiplexor (MUX) 322 that receives the plurality of analog current detection signals produced by the plurality of PDs 104 and outputs one of the analog current detection signals in dependence on the selection signal produced by the comparator 324. As was discussed above, the comparator 324 can compare amplitudes of the plurality of analog current detection signals to one another and produce the selection signal in dependence on which one of the analog current detection signal has a greatest amplitude. Alternatively, as was also explained above, the comparator 324 can produce the selection signal in dependence on which one of the analog current detection signals has a lowest phase difference relative to a transmit (TX) signal that is used to control the selective driving of the light source(s) 104, or relative to some other reference signal. It is also possible that the comparator 324 compares both amplitudes and phase differences to produce its selection signals based on both amplitudes and phase differences.

The system is also shown as including a subsystem 610. The subsystem 610 can be selectively enabled or disabled by the controller 608 in dependence on the digital detection signal output by the ADC 120. Additionally, or alternatively, the controller 608 can selects one of a plurality of different possible responses or actions in dependence on the digital detection signal output by the ADC 120. As mentioned above, the controller 608 can also receive the selection signal produced by the comparator 324, or more generally by the WTA circuit 326, so that the controller 608 knows which PD 114 and FOV is associated with the digital detection signal output by the ADC 120. Based on such information the controller 608 can, for example, determine how to maneuver a robot, determine what warning message to issue, determine what light to turn on, or the like.

In accordance with an embodiment, if the digital signal output by the ADC 120 is below a specified threshold, it can be assumed that the PDs 114 are just picking up optical noise, and that there is not really an object within the FOV of any of the PDs 114. The controller 608 can, for example, compare the output of the ADC 120 to a threshold to determine whether or not the digital output of the ADC 120 is actually indicative of an object being within one of the FOVs. Other implementations are also possible, as would be understood by one or ordinary skill in the art.

Embodiments described herein can be implemented as an application specific integrated circuit (ASIC). Alternatively, embodiments described herein can be implemented using discrete components. Other variations are also possible and within the scope of an embodiment. A controller, implemented as a processor, microcontroller unit (MCU) or state machine, but not limited thereto, can be used to control the optical proximity detectors described herein.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The breadth and scope of the present invention should not be limited by any of the above-described exemplary embodiments, but should be defined only in accordance with the following claims and their equivalents.

What is claimed is:

1. An optical proximity detector, comprising:
a plurality photodetectors (PDs) each having a respective field of view (FOV) and each producing a respective analog current detection signal indicative of light incident on and detected by the PD;
a comparator that compares the plurality of analog current detection signals produced by the plurality of PDs and produces a selection signal in dependence thereon;
a multiplexor (MUX) that receives the plurality of analog current detection signals produced by the plurality of PDs and outputs one of the analog current detection signals in dependence on the selection signal produced by the comparator; and
circuitry that produces a digital detection signal corresponding to the one of the analog current detection signals output by the MUX.

2. The optical proximity detector of claim 1, wherein:
when only one of the plurality of PDs has an object within its FOV, the digital detection signal output by the circuitry corresponds to the PD having the object within its FOV; and
when more than one of the plurality of PDs has an object within its FOV, the digital detection signal output by the circuitry corresponds to the PD have a closest object relative to the PD within its FOV.

3. The optical proximity detector of claim 1, wherein the circuitry that produces a digital detection signal corresponding to the one of the analog current detection signals output by the MUX comprises:
a transimpedance amplifier (TIA) that converts the one of the analog current detection signals, output by the MUX, to an analog voltage detection signal;
an amplifier that amplifies the analog voltage detection signal to produce an amplified analog voltage detection signal; and
an analog-to-digital converter (ADC) that converts the amplified analog voltage detection signal to the digital detection signal corresponding to the one of the analog current detection signals output by the MUX.

4. The optical proximity detector of claim 1, wherein the comparator compares amplitudes of the plurality of analog current detection signals to one another and produces the selection signal in dependence on which one of the analog current detection signal has a greatest amplitude.

5. The optical proximity detector of claim 1, wherein the comparator produces the selection signal in dependence on which one of the analog current detection signals has a lowest phase difference relative to a reference signal.

6. The optical proximity detector of claim 1, further comprising:
one or more light sources; and
a driver that selectively drives the one or more light sources, to emit light, in dependence on a transmit signal;
wherein each PD, of the plurality of PDs, detects light emitted by at least one of the one or more light sources that has reflected off an object, if any, within the FOV of the PD and produces the analog current detection signal in dependence thereon.

7. The optical proximity detector of claim 6, further comprising a controller that produces a transmit signal that is provided to the driver and the comparator.

8. A method, comprising:
(a) producing, at each of a plurality of photodetectors (PDs) that each have a respective field of view (FOV), a respective analog current detection signal indicative of light emitted by one more light sources that reflected of an object, if any, within the FOV of the PD and is incident on and detected by the PD;
(b) comparing the plurality of analog current detection signals produced by the plurality of PDs to thereby determine which PD has a closest object to the PD within the FOV of the PD; and
(c) producing a digital output corresponding to the analog current detection signal produced by the PD that has a closest object to the PD within the FOV of the PD.

9. The method of claim 8, wherein:
step (b) includes comparing amplitudes of the analog current detection signals produced by the plurality of PDs to determine which analog current detection signal has a greatest amplitude.

10. The method of claim 8, wherein:
steps (b) includes determining which one of the analog current detection signals has a lowest phase difference relative to a reference signal.

11. The method of claim 8, further comprising, prior to step (a), selectively driving one or more light sources to emit light.

12. The method of claim 8, further comprising, after step (c), selecting one of a plurality of different possible responses or actions in dependence on the digital output produced at step (c).

13. The method of claim 12, wherein the selecting one of a plurality of different possible responses or actions is also in dependence on the results of the comparing at step (b).

14. The method of claim 8, further comprising, after step (c), selectively enabling or disabling a subsystem in dependence on the digital output produced at step (c).

15. A system, comprising:
one or more light sources that are selectively driven to emit light;
a plurality photodetectors (PDs) each having a respective field of view (FOV) and each producing a respective analog current detection signal indicative of light, emitted by at least one of the one or more light sources, that has reflected off an object, if any, with the FOV of the PD and is incident on and detected by the PD;
a winner-take-all (WTA) circuit that receives the plurality of analog current detection signals produced by the plurality of PDs and outputs one of the analog current detection signals that corresponds to the PD having a closest object within its FOV; and
circuitry that produces a digital detection signal corresponding to the one of the analog current detection signals output by the WTA circuit.

16. The system of claim 15, wherein the WTA circuit comprises:
a comparator that compares the plurality of analog current detection signals produced by the plurality of PDs and produces a selection signal in dependence thereon; and
a multiplexor (MUX) that receives the plurality of analog current detection signals produced by the plurality of PDs and outputs one of the analog current detection signals in dependence on the selection signal produced by the comparator;
wherein the one of the analog current detection signals output by the MUX is the one of the analog current detection signals output by the WTA circuit.

17. The system of claim 16, wherein the comparator compares amplitudes of the plurality of analog current detection signals to one another and produces the selection signal in dependence on which one of the analog current detection signal has a greatest amplitude.

18. The system of claim 16, wherein the comparator produces the selection signal in dependence on which one of the analog current detection signals has a lowest phase difference relative to a reference signal.

19. The system of claim 16, further comprising:
a controller that selectively enables or disables a subsystem, or selects one of a plurality of different possible responses or actions, in dependence on the digital detection signal and the selection signal produced by the comparator.

20. The system of claim 14, further comprising:
a controller that selectively enables or disables a subsystem, or selects one of a plurality of different possible responses or actions, in dependence on the digital detection signal.

* * * * *

UNITED STATES PATENT AND TRADEMARK OFFICE
CERTIFICATE OF CORRECTION

PATENT NO. : 9,671,495 B2
APPLICATION NO. : 14/521308
DATED : June 6, 2017
INVENTOR(S) : Manoj Bikumandla It is certified that error appears in the above-identified patent and that said Letters Patent is hereby corrected as shown below:

On the Title Page

Item (57), under "ABSTRACT", in Column 2, Line 1, delete "plurality" and insert -- plurality of --, therefor.

In the Drawings

In Fig. 1, Sheet 1 of 7, for Tag "108", in Line 2, delete "CONTROL" and insert -- CONTROLLER --, therefor.

In Fig. 2, Sheet 2 of 7, for Tag "108", in Line 2, delete "CONTROL" and insert -- CONTROLLER --, therefor.

In Fig. 3, Sheet 3 of 7, for Tag "108", in Line 2, delete "CONTROL" and insert -- CONTROLLER --, therefor.

In Fig. 5, Sheet 5 of 7, for Step "504", in Line 2, delete "reflected of" and insert -- reflected off --, therefor.

In the Specification

In Column 1, Line 50, delete "accordance" and insert -- in accordance --, therefor.

In Column 2, Line 27, delete "the the" and insert -- the --, therefor.

In Column 2, Line 36, delete "ADCs 116." and insert -- ADCs 120. --, therefor.

In Column 5, Line 37, delete "circuit $432_1$." and insert -- circuit $432_2$. --, therefor.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,671,495 B2

In Column 7, Line 9, delete "one more light sources that reflected of" and insert -- one or more light sources that reflected off --, therefor.

In Column 8, Line 17, delete "plurality" and insert -- plurality of --, therefor.

In Column 8, Line 21, delete "PDs 104" and insert -- PDs 114 --, therefor.

In Column 8, Line 53, delete "PDs 104" and insert -- PDs 114 --, therefor.

In Column 8, Line 56, delete "PDs 104" and insert -- PDs 114 --, therefor.

In the Claims

In Column 9, Line 53, in Claim 1, delete "plurality" and insert -- plurality of --, therefor.

In Column 10, Lines 53-54, in Claim 8, delete "one more light sources that reflected of" and insert -- one or more light sources that reflected off --, therefor.

In Column 11, Line 2, in Claim 10, delete "steps" and insert -- step --, therefor.

In Column 11, Line 21, in Claim 15, delete "plurality" and insert -- plurality of --, therefor.